(No Model.)
P. CLARK.
COMBINED DYNAMOMETER AND SAFETY VALVE.
No. 318,697. Patented May 26, 1885.
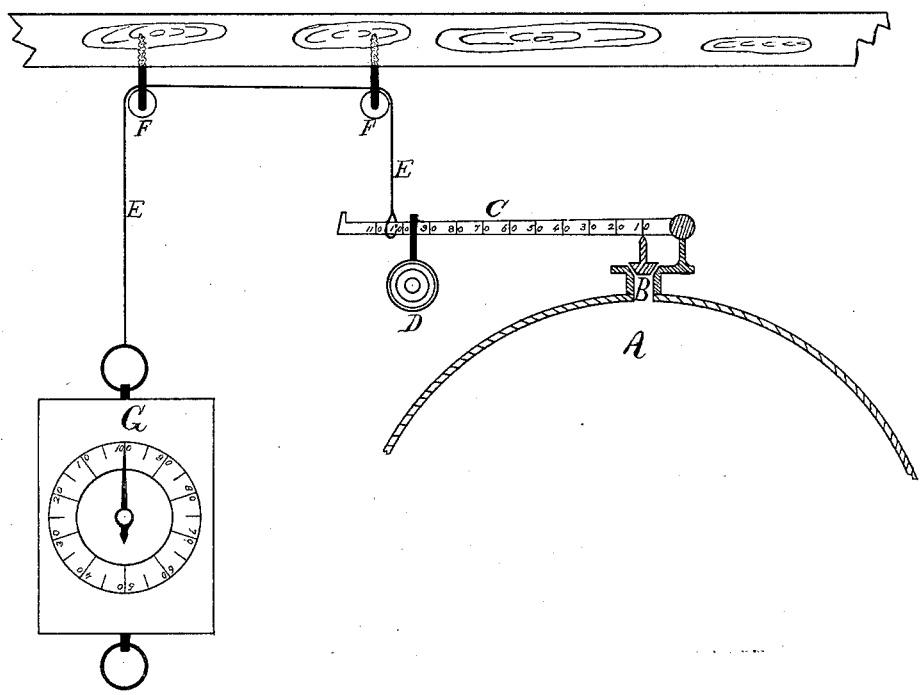
Witnesses
James H. Clark
W. E. Clark
Inventor
Patrick Clark

UNITED STATES PATENT OFFICE.

PATRICK CLARK, OF RAHWAY, NEW JERSEY.

COMBINED DYNAMOMETER AND SAFETY-VALVE.

SPECIFICATION forming part of Letters Patent No. 318,697, dated May 26, 1885.

Application filed January 6, 1882. (No model.)

*To all whom it may concern:*

Be it known that I, PATRICK CLARK, of the city of Rahway, in the county of Union and State of New Jersey, have invented an Improvement in Preventing the Explosion of Steam-Boilers, when resulting from safety-valves which have become corroded to their seats from long disuse; and I do hereby declare that the following is a full and exact description thereof, reference being had to the accompanying drawings, and the letters and figures marked thereon.

The safety-valve and steam-gage, acting independently of each other, have heretofore been relied on to insure safety from explosion; yet hundreds of boilers explode every year, destroying hundreds of lives and millions of property. It is now generally conceded that a boiler could not be exploded, under ordinary circumstances, if the safety-valve were of proper size, (which it generally is,) and were kept in good order by frequent use and not overweighted.

Before the advent of steam-gages the fireman judged of the amount of his steam-pressure by feeling of or slightly lifting his safety-valve lever until he heard the steam blow off, and thereby judged of the amount of his steam-pressure in regard to the work required of his boiler. When the steam-gage was introduced, the manipulation of the safety-valve was abandoned, and the gage was relied on to show the amount of pressure on the boiler. As a matter of economy of fuel, the safety-valve was weighted from five to ten pounds per square inch beyond the pressure necessary to do the work, and if the fireman was careful and attentive to his duty the safety-valve might remain undisturbed for months or even years. Under such circumstances the valve would become so corroded to its seat that several hundred pounds per square inch would not disturb it, and consequently the boiler is liable to be exploded by an excessive pressure of steam. Under such circumstances a steam-gage used independent of the safety-valve, (which is the rule,) although a convenience is really a dangerous appliance. Now, to correct this defect and make the safety-valve operative at all times, I have invented the device described in the following specification and the drawing annexed thereto, by means of which the gage and safety-valve are so connected that the gage cannot indicate the pressure without lifting the safety-valve, and thereby keep the safety-valve in perfect order, and so prevent disastrous steam-boiler explosions.

In the annexed drawing, A represents a steam-boiler, to which is attached the safety-valve B, with the usual lever, C, and weight D. To the lever C is attached a cord or chain, E E, running over the grooved pulleys F F. To the pendent end of the cord or chain is attached the graduated dynamometer G, the dynamometer being graduated into equal parts. The chain or cord E E may be attached to the safety-valve lever at a point distant from the fulcrum, so that the equal division or graduations on the scale of the dynamometer will indicate any number of pounds pressure per square inch at which the safety-valve will be lifted from its seat. Consequently when the dynamometer is pulled downward by the fireman until he hears the steam issue from the safety-valve the dynamometer will have performed two valuable functions instead of one— viz., it will indicate the amount of steam-pressure, and at the same time so disturb the safety-valve as to prevent all possibility of adhesion between the valve and its seat, and so accomplish the purpose above set forth—viz: safety from disastrous explosion on account of the adhesion of the safety-valve to its seat from long disuse. As in this case the dynamometer takes the form of a spring-balance, and if the equal divisions be marked by figures to indicate the pressure in pounds per square inch, the figures will be placed on the scale inverse, as direct figures would indicate the complement of the pressure instead of the pressure. Now, I am aware that the attachment of a dynamometer or spring to a safety-valve lever as a substitute for a weight for the purpose of holding the valve on its seat against a given pressure is old and well known, and that the attachment of a chain or cord to the lever of a safety-valve, and so preventing adhesion, is also in common use; but

What I claim as my invention, and desire to secure by Letters Patent, is—

In combination with a steam-boiler having a safety-valve, B, the lever C, weight D, cord E, connected at one end with said lever, the spring-dynamometer G, attached to the other end of said cord, and having on its face inversely-arranged graduated figures, the dynamometer to be drawn by the fireman or attendant, substantially as and for the purpose set forth.

PATRICK CLARK.

Witnesses:
JAMES H. CLARK,
W. E. CLARK.